April 22, 1969  L. F. SCHMID  3,439,786

HYDRAULIC BRAKE FOR AUTOMOTIVE VEHICLES

Filed June 8, 1967

INVENTOR.
LEOPOLD F. SCHMID
BY
*Karl J. Ross*
ATTORNEY

April 22, 1969 L. F. SCHMID 3,439,786
HYDRAULIC BRAKE FOR AUTOMOTIVE VEHICLES
Filed June 8, 1967 Sheet 2 of 3

INVENTOR.
LEOPOLD F. SCHMID
BY
Karl F. Ross
ATTORNEY.

April 22, 1969   L. F. SCHMID   3,439,786
HYDRAULIC BRAKE FOR AUTOMOTIVE VEHICLES
Filed June 8, 1967

INVENTOR.
LEOPOLD F. SCHMID
BY
Karl F. Ross
ATTORNEY

United States Patent Office 3,439,786
Patented Apr. 22, 1969

3,439,786
HYDRAULIC BRAKE FOR AUTOMOTIVE VEHICLES
Leopold Franz Schmid, Stuttgart, Germany, assignor to Alfred Teves Maschinen- und Armaturenfabrik KG, Frankfurt am Main, Germany, a corporation of Germany
Filed June 8, 1967, Ser. No. 644,547
Claims priority, application Germany, June 18, 1966,
T 31,389
Int. Cl. F16d *41/24, 67/00;* F16h *57/10*
U.S. Cl. 192—4                              11 Claims

ABSTRACT OF THE DISCLOSURE

A differential brake for an automotive vehicle wherein one annular braking surface is keyed to a rotatable planetary-gear housing of the differential, and another annular braking face is provided coaxially therewith on at least one of the output shafts or wheel axles of the differential, and either a brake ring is wedged between both faces, or the brake members carrying the faces are clamped together by the brakeshoes so that the same braking force is applied to both faces. The members can be constituted as a disk in which case the brakeshoes form part of a disk brake, or constituted as part of a double-cone brake in which the brake ring is axially shiftable.

---

The present invention relates to a hydraulic brake system and, more particularly, to a brake arrangement in the driving train of an automotive vehicle.

The braking systems of automotive vehicles have hitherto generally comprised "wheel" brakes in which a hydraulic cylinder disposed on each side of the vehicle and at each wheel urged a respective brakeshoe into contact with a moving braking face coupled with a vehicle wheel. Commonly, each wheel was mounted upon a brake drum in which a pair of arcuate brakeshoes were displaced outwardly by the hydraulic cylinder (internal-expanding brakes), or a brake disk was provided on each wheel hub or axle for co-operation with a brake-support yoke disposed along the periphery of the disk; in the latter case, one or more wheel cylinders may be supplied with hydraulic fluid to press respective brakeshoes axially against the annular braking faces of the disk.

It has been found that especially in modern automotive vehicles and trucks, it is advantageous to maintain the mass of the vehicle which is not resiliently suspended from the wheels as small as possible and thereby decrease the vibrational stress applied thereto. To decrease the mass at the vehicle wheels, therefore, it has been proposed to provide a brake in the region of the axle housing or driving train; prior efforts along these lines have proved to be ineffective and less safe than the wheel brake. The ineffectiveness appeared to be a consequence, largely, of nonuniform or inconstant braking force or nonuniform brake-lining wear.

It is, therefore, the principal object of the present invention to provide an improved braking system for automotive vehicles whereby the mass of the vehicle unsupported by the vehicle suspension can be reduced without any significant reduction in the braking efficiency or operational safety of the vehicle.

Another object of my invention is to provide an improved brake system for an automotive vehicle along the power train thereof which avoids the disadvantages of earlier braking devices of that general type.

Having found that the principal reason for the ineffectiveness of earlier systems derives from the complexity of the control devices necessary for adequately operating the brake, I provide a pair of braking surfaces which co-operate with respective brakeshoes and obviate the need for complicated control arrangements. More specifically, the braking system of the present invention comprises a first braking surface which is coupled with the differential planetary-gear housing and a further braking face coaxial with the first-mentioned braking face which is rigidly connected with one of the axle shafts. The two braking faces may, moreover, be interconnected by a friction clutch for limited-slip or differential-locking operation. The "transmission" brake may of course be provided on the speed-change transmission itself or upon the differential assembly. Essentially, the device is provided with means for ensuring that the identical braking force is applied concurrently to the braking faces.

The difficulties hitherto encountered where the wheel brakes operated under different conditions (e.g., wet and dry, low or high lining wear, unequal brake-fluid pressure at the wheels) are completely eliminated.

The above and other objects, features and advantages of this invention will become more readily apparent from the following description, reference being made to the accompanying drawing in which.

Figure 1:
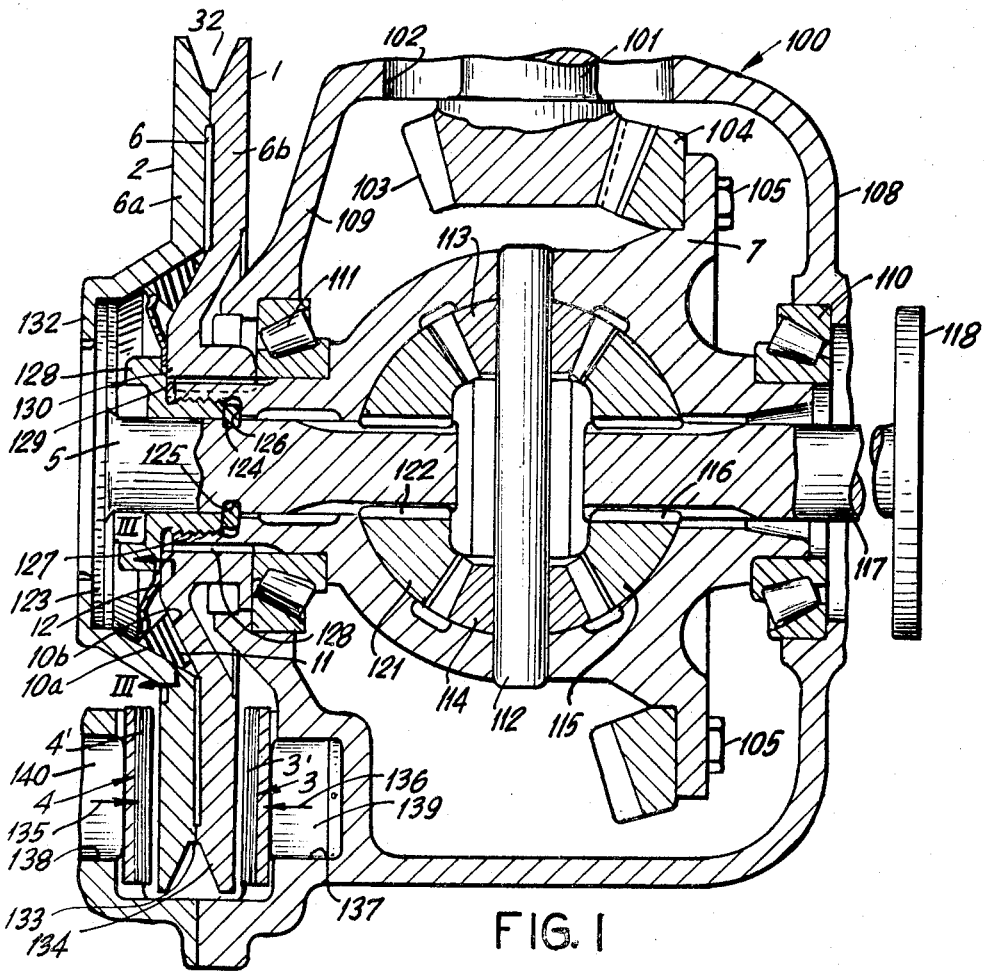
FIG. 1 is an axial cross sectional view, taken along a horizontal plane, of a differential embodying this invention.

In the embodiments described hereinafter with reference to the drawing, the hydraulically operable vehicle brake is of the type generally termed a "transmission brake" in which the braking faces are carried by a driving or driven member of the gear-change transmission or other parts of the power train and are mounted upon the resiliently suspended chassis part together with the transmission and/or differential housing, the power shaft, etc.

In FIG. 1 of the drawing, I show a transmission brake system according to this invention which is associated with a differential assembly 100 whose housing 8 is sectioned along a horizontal plane and the interior viewed from above. The power shaft 101 from the engine and gear-shift or automatic transmission enters the differential housing 8 through a forward opening 102 which can be closed by a bearing plate (not shown) in the usual manner, the bearing plate supporting at least in part the shaft 101. In some cases, a transmission T (FIG. 4) is mounted at the forward end of the differential housing. Shaft 101 carries a bevel gear 103 in mesh with a gear ring 104 connected by bolts 105 to a flange 106 of the planetary-gear housing 7 which is journaled in the lateral walls 108 and 109 of the differential housing 8 by bearings 110 and 111, respectively. A shaft 112 extending diametrically through the planetary gear housing 7 carries a pair of planetary gears 113 and 114 which jointly mesh with a sun gear 115 splined at 116 to axle shaft 117 whose flange 118 connects it with a further portion of the axle or with the right-hand rear wheel 120 (FIG. 4) in the unusual manner. Similarly, a sun gear 121 is splined at 122 to the axle shaft 5 whose flange 123 is connected as previously indicated to the left-hand rear wheel of the vehicle. The axle shaft 5 is held in place with respect to the housing 7 by a split ring 124 which is received in peripheral groove 125 of this shaft and is locked against the shoulder 126 of an axial extension 127 of the housing by a tubular clamping nut 128 threaded into this extension.

The differential planetary-gear housing 7 is splined along the exterior of the extension 127 at 128 and carries a disk 6b whose mating splines 129 key this disk to the extension 127 while enabling it to be removed axially therefrom and ensure that the disk 6b is angularly entrained by the planetary gear housing 7. A shoulder 130 of the clamping sleeve 128 also locks the disk 6b against the inner race of bearing 111 so as to ensure that members 6b, 128 and 7 rotate together. Parallel to the brake face 1, I provide a further disk 6a which is connected at its hub 123 to the flange 132 of axle shaft 5. According to the principles of this invention, the disk halves 6a and 6b are provided with annular faces 1 and 2, respectively, as braking faces of a disk-brake assembly.

The housing 100 further includes, according to this invention, a pair of disk-brake shoes 3 and 4, respectively confronting the annular braking faces 1 and 2 of the disk portions 6a and 6b and adapted to frictionally engage these braking faces and slow the rotation of the disk with respect to the housing 100.

Figure 4:
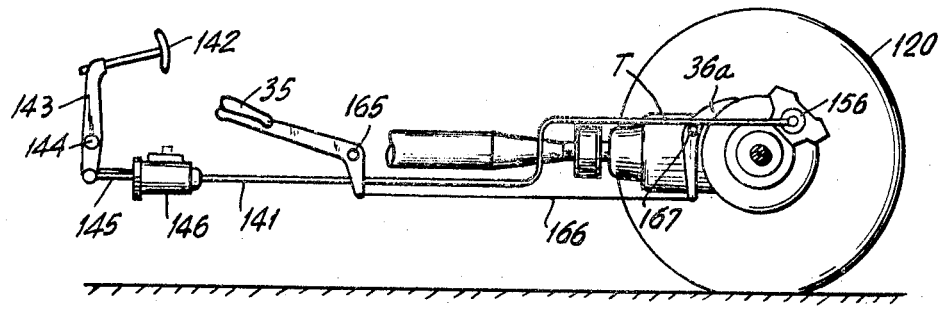
FIG. 4 is a diagrammatic side-elevational view illustrating a brake system according to this invention.

The disk portions 6a and 6b have annular shoulders 133, 134 which may slidably engage one another and axially bear lightly upon each other when the brakeshoes 3, 4 are not applied or which may be spaced very slightly apart. When the brakeshoes 3 and 4 are applied in the direction of arrows 135, 136, the disk portions 6a and 6b are brought into frictional interengagement and direct contact so that their respective peripheral speeds are essentially identical and the same braking forces are applied to the disk 6a, 6b formed by the two portions. Each of the brakeshoes 3, 4 co-operates with a respective wheel-brake cylinder 137 or 138 in which the pistons 139, 140 are axially shiftable by hydraulic fluid delivered from a line 141 to the wheel-brake cylinder (FIG. 4). To this end, the brake system comprises a pedal 142 whose lever 143 is fulcrumed at 144 to the chassis in the region of the driver's seat and is coupled by the piston rod 145 to the plunger of a hydraulic master cylinder 146 supplying fluid to the line 141.

Figure 2A:
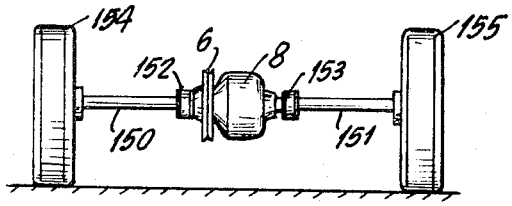
FIG. 2a is an elevational view showing one embodiment of this braking system and corresponding to FIG. 1.
Figure 3:
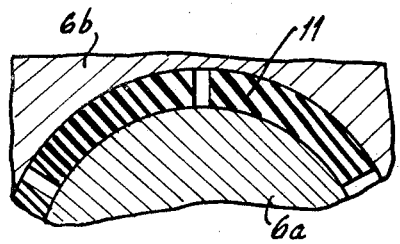
FIG. 3 is a cross sectional view, taken generally along the line III—III of FIG. 1.
Figure 2B:
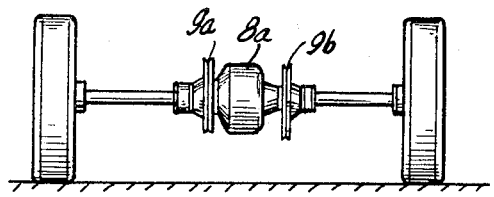
FIG. 2b is an elevational view of a modified braking arrangement.

Thus, the system of FIGS. 1 and 4 provides a pair of annular brake faces 1, 2 which are located upon the opposite axial flanks of the disk-like structure 6 formed by the pair of disk portions 6a and 6b, of which disk portion 6a is fixed to the axle shaft or wheel shaft 5 and is rotatably entrained therewith, while the disk half 6b is rigidly connected with the planetary-gear housing 7 of the differential and is rotatably entrained thereby. As illustrated in FIG. 2a, the axle housing 8 of the differential 100 lies in the median plane of the vehicle which has axle members 150 and 151 secured to the axle shafts 5 and 117 at the flange 123 and 118, respectively, the flange coupling being represented at 152 and 153. The driven wheels of the vehicle are shown at 154 and 155 and are coupled respectively to the axle shafts 150 and 151. For normal vehicle operation and for moderate vehicle speeds, the differential essentially is provided with only a single disk-like structure 6 co-operating with the piston and wheel-cylinder assembly 156 (FIG. 4) on one side of the housing 8. For heavier and faster vehicles, e.g. industrial trucks, the arrangement illustrated in FIG. 2b can be employed. In this case, the differential housing 8a is provided with a pair of disk formations 9a and 9b connected to the planetary gear housing and the respective output shaft, and with a pair of brake cylinders in the differential housing flanking each of the disk-like structures 9a and 9b. According to a specific feature of this invention, the brake system, whether of the type illustrated in FIG. 2a or that of FIG. 2b, is designed so that the disk halves 6a and 6b or portions thereof practically contact one another with a minimal play and are brought into mutual surface contact when pressure is applied by the pistons 139 and 140 to the brakeshoes 3 and 4. Thus, when the hydraulic brake is actuated, both disk halves are pressed together.

The braking pressure on both faces 1 and 2 is thus the same regardless of the degree of wear of the brake linings 3' and 4' of the brakeshoes.

Furthermore, the two disk halves are provided with respective confronting contact surfaces 10a and 10b which are inclined to one another and are substantially coaxial with the outer surface 10a having the sharper apex angle, and the inner frustoconical surface 10b having a shallower apex angle. Thus, a V-section annular space is provided between the frustoconical braking surfaces 10a and 10b into which is urged an element in the form of a wedge-shaped ring 11 which may be subdivided angularly into spaced segments. The surfaces 10a and 10b coverage outwardly at an acute angle corresponding essentially to that defined by the flanks of the clutch ring 11 which is urged into the V-shaped clearance by a dished-disk spring 12. The inner edge of the flat spring washer 12 is locked between the clamping nut 128 and the disk portion 6b, while the outer rim of the spring bears upon the ring 11. The ring is composed of synthetic resin or an elastomer (e.g., rubber) and acts upon both disk halves with a constant frictional force so as to brake the relative rotation of the disk relative to one another. This frictional locking of one axle and the corresponding sun gear 122 to the planetary-gear housing 7 constitutes the device as a limited-slip or lockable differential which functions to prevent free-running of the wheels of the vehicle, skidding on curves, free-wheeling, power loss, etc.

Figure 5:
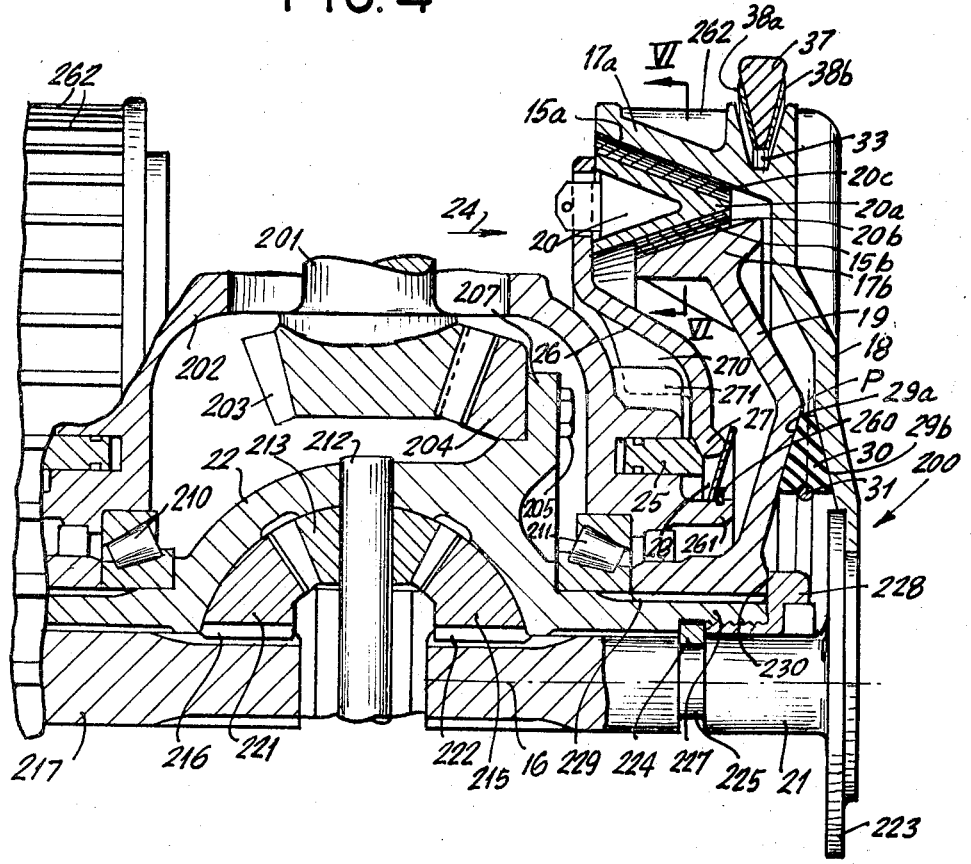
FIG. 5 is a fragmentary axial cross sectional view according to another embodiment of this invention.

In the system of FIG. 5, the differential 200 may include a housing 202 into which the power shaft 201 extends in the usual manner. This power shaft carries the driving pinion 203 and is rotated directly by the engine or a speed-change transmission, the pinion meshing with a ring gear 204 affixed to the planetary-gear housing 22 at a flange 207 by bolts 205. The planetary-gear housing 22 is journaled in the walls of housing 202 in a pair of bearings 210 and 211, while carrying the planet shaft 212. The latter supports a pair of planetary gears (one shown) 213 which mesh with sun gears 215 and 221 respectively keyed to the output or axle shafts 21 and 217 at 222 and 216. The axle shaft 21 has a flange 223 which is provided with a differential-brake assembly represented diagrammatically at 23b in FIG. 7 and is connected by coupling 253 to the wheel shaft 251 of the vehicle. A similar differential brake is provided between the coupling 252 of the axle 217 and the differential 22a. A nut 228 is threaded into the tubular extension 227 of the planetary housing 22 and engages a split ring 224 which is seated in a peripheral groove 225 of the output shaft 21 and thus limits relative axial movement of this output shaft with respect to the planetary housing 22. Furthermore, the nut 228 has an abutment face or shoulder 230 forming a stop for a disk 19 which is keyed at 229 to the extension 227.

Figure 7:
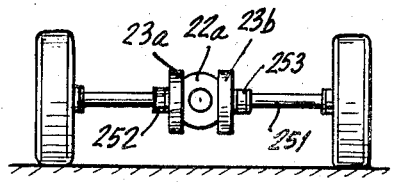
FIG. 7 is a view similar to FIGS. 2a and 2b but representing the modification of FIG. 5.

The brake disks 18 and 19 are respectively provided with coaxial mutually convergent frustoconical surfaces 15a and 15b which converge in opposite direction toward the axis of rotation 16 of axle 21. These surfaces are provided upon respective annular flanges 17a and 17b of the diskc 18 and 19 and are interengagable by friction element 20 of V-shaped section. The friction ring 20 comprises a V-shaped core 20a upon which the friction linings 20b and 20c are mounted. The axial movement of the friction element 20 is effected by the disk 26 which is held against an annular piston 25 by a spring washer 26 retained by a split washer 260 upon an axial projection 261 of the housing 202. Thus the friction element 20 is hydraulically shiftable in the direction of arrow 24 into contact with the brake surfaces 15a and 15b of the disks 18 and 19 against the restoring force of the spring 28. The flange 17a of the outer disk 18 is provided with ribs 262 to facilitate dissipation of the heat evolved during the braking action. In the embodiment of FIG. 1, the braking faces 1, 2 lie in planes perpendicular to the axis of rotation of the shaft whereas in the system of FIG. 5, the braking faces 15a and 15b are substantially transverse to the rotational plane of when the hydraulic brakes are actuated the braking faces 1, 2 and 15a, and 15b receive identical braking faces; they are not affected by the normal wheel brake variations. Since the peripheral speed of the outer disk 18 and its braking surface 15a is greater than that of the inner disk 19 and its braking face 15b, the brake linings 20b and 20c are dimensioned accordingly to maintain the brake effect constant upon both disks. To this end, the brake lining 20c engageable with surface 15a is of a larger area than the contact surface of the brake lining 20b. As illustrated in FIG. 7, a pair of brake devices 23a and 23b can be provided on either side of the differential housing 22a when large vehicles, heavily loaded vehicles or fast vehicles are to be braked.

Figure 6:
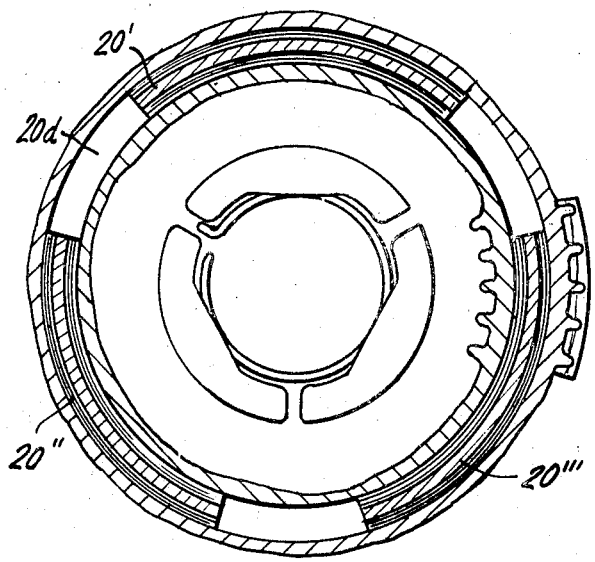
FIG. 6 is a cross sectional view taken along the line VI—VI of FIG. 5 but drawn to a different scale.

In the system of FIG. 5, the brake faces 15a and 15b are inclined to the axis 16 at the same angle although in opposite direction. The brake ring 20 is in turn subdivided into a plurality of sectors 20′, 20″ and 20‴ (FIG. 6) separated by gaps 20d to permit expansion of the sectors and to serve as cooling channels. The piston 25 can be similarly subdivided into sectoral piston portions which bear upon the rounded inner rim 27 of the annular disk 26. The rim 27 is seated upon the piston 25 and is held thereagainst by the spring 28 thereby permitting eccentricities or stress in the braking operation to be compensated. The coupling between the brake ring 20 and the piston 25 is thus permitted a limited degree of radial and axial mobility. The disk 26 is prevented from rotating along with the brake faces 15a and 15b by ribs 270 which are angularly equispaced about the disk and engage between fixed ribs 271 of the housing 202.

The disks 18 and 19 are, according to a further feature of this invention, provided with a pair of frustoconical braking faces 29a and 29b which converge outwardly toward a median plane P perpendicular to the axis 16 of the shaft 21 at an acute angle A. V-section wedge-shaped ring which may be segmented or is otherwise outwardly expandable, is urged by an annular expansion spring 31 readily into the clearance between the surfaces 29a and 29b to apply a constant frictional force between the two surfaces to limit the slip of the differential as previously described.

Figure 8:
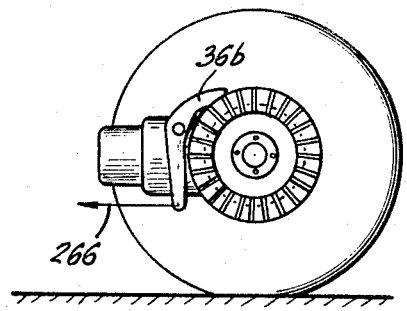
FIG. 8 is an elevational view diagrammatically showing the actuating mechanism for this brake.

The systems in FIGS. 1 and 5 are, moreover, provided with handbrakes for emergency-brake, locking-brake or parking-brake purposes, the handbrakes having, as illustrated in FIG. 4, a lever 35 fulcrumed at 165 adjacent the driver's seat of the vehicle and actuated via a cable 166, a bell crank lever 36a which is fulcrumed at 167 to the transmission housing T. The free arm of lever 36a is of a wedge-shaped system at 37 (see FIG. 5) and provided with a pair of brake linings 38a along its flanks for engagement in the V-section peripheral recess 32 defined by the brake halves 6a and 6b. The coaxial brake disks 18 and 19 of the system of FIG. 5 have a corresponding V-shaped recess 33 in the disk 18 for receiving the brake linings 38a and 38b of the brakeshoe portion 37 of lever 36b (FIG. 8) which is actuated by a cable 266 in the manner described in connection with FIG. 4.

The invention described and illustrated is believed to admit of many modifications within the ability of persons skilled in the art, all such modifications being considered within the spirit and scope of the appended claims.

I claim:

1. In a motor vehicle having a power train including a gear housing rotatable about an axis and an output shaft operatively coupled with said housing and rotatable about the axis thereof, a transmission brake comprising: a first annular brake member rotatably entrained with said housing and a second annular brake member rotatably entrained with said shaft, said brake members having coaxial annular braking faces and annular frustoconical brake surfaces converging toward one another; respective brakeshoe means juxtaposed with said faces and concurrently shiftable for frictional engagement therewith; means for applying said brakeshoe means with substantially identical braking force to said faces of said members; and at least one wedge-shaped element urged into engagement with said brake surfaces in the direction of convergence thereof.

2. The brake defined in claim 1 wherein said power train includes a planetary-gear differential and said housing forms the rotatable planetary-gear housing of said differential, said output shaft being connected to a wheel of the vehicle, said members together defining a disk lying generally perpendicular to said axis and said brakeshoe means forming part of a disk-brake assembly disposed along the periphery of said disk, said members being mutually engageable upon application of braking force to said disk by said brakeshoe means.

3. In a motor vehicle having a power train including a gear housing rotatable about an axis and an output shaft operatively coupled with said housing and rotatable about the axis thereof, a transmission brake comprising: a first brake member rotatably entrained with said housing and a second brake member rotatably entrained with said shaft, said brake members having coaxial annular braking faces; respective brakeshoe means juxtaposed with said faces and concurrently shiftable for frictional engagement therewith, means for applying said brakeshoe means with substantially identical braking force to said faces of said members, said power train including a planetary-gear differential and said housing forming the rotatable planetary-gear housing of said differential, said output shaft being connected to a wheel of the vehicle, said members together defining a disk lying generally perpendicular to said axis and said brakeshoe means forming part of a disk-brake assembly disposed along the periphery of said disk, said members being mutually engageable upon application of braking force to said disk by said brakeshoe means, said members forming disk halves and being axially engageable with one another upon the application of braking force to said faces, said members defining between them an annular recess of V-shaped configuration with annular surfaces including an acute angle between them, said surfaces being coaxial with one another and centered on said axis; and an annular friction body of a cross-section complementary to that of said recess and receivable therein for concurrent frictional engagement with said surfaces of said members, and spring means urging said body into said recess.

4. The brake defined in claim 3 wherein said differential has a pair of output shafts connected with the respective vehicle wheel and a pair of brakes are provided respectively between said housing and the respective output shafts.

5. The brake defined in claim 1 wherein said power train includes a planetary-gear differential and said housing forms the rotatable planetary-gear housing of said differential, said output shaft being connected to a wheel of the vehicle, one of said faces being of relatively large diameter and surrounds said one of said faces, said faces converging toward one another at an acute angle, said brakeshoe means being constituted as a brake ring having a cross section complementary to that of the space defined between said faces and being provided with respective brakeshoes engageable with said faces.

6. In a motor vehicle having a power train including a gear housing rotatable about an axis and an output shaft operatively coupled with said housing and rotatable about the axis thereof, a transmission brake comprising: a first brake member rotatably entrained with said housing and a second brake member rotatably entrained with said shaft, said brake members having coaxial annular braking faces, respective brakeshoe means juxtaposed with said faces and concurrently shiftable for frictional engagement therewith; means for applying said brakeshoe means with substantially identical braking force to said faces of said members, said power train including a planetary-gear differential and said housing forming the rotatable planetary-gear housing of said differential, said output shaft being connected to a wheel of the vehicle, one of said faces being of relatively large diameter and surrounding said one of said faces, said faces converging toward one another at an acute angle, said brakeshoe means being constituted as a brake ring having a cross-section complementary to that of the space defined between said faces and being provided with respective brakeshoes engageable with said faces, said faces being frustoconically convergent toward said axis in opposite axial directions and said ring being axially shiftable relatively to said members, the outer one of said faces being coupled with said output shaft and the other of said faces being coupled with said housing; and a piston axially shiftable with respect to said members for urging said ring into engagement with said faces.

7. The brake defined in claim 6 wherein the brakeshoe engageable with the inner face has a relatively small area and the brakeshoe engageable with the outer face has a relatively large area, said ring being provided with a disk coupled with said piston with freedom of relative radial and axial movement.

8. The brake defined in claim 6 wherein said ring is subdivided into a plurality of angularly spaced sectors.

9. The brake defined in claim 6 wherein said members are provided with respective mutually convergent annular surfaces centered on said axis, said brake further comprising an annular frictional body received between said surfaces and frictionally coupling said members while permitting relative angular movement thereof, and spring means for urging said body into engagement with said surfaces.

10. In a motor vehicle having a power train including a gear housing rotatable about an axis and an output shaft operatively coupled with said housing and rotatable about the axis thereof, a transmission brake comprising: a first brake member rotatably entrained with said housing and a second brake member rotatably entrained with said shaft, said brake members having coaxial annular braking faces; respective brakeshoe means juxtaposed with said faces and concurrently shiftable for frictional engagement therewith; means for applying said brakeshoe means with substantially identical braking force to said faces of said members, at least one of said members forming a peripheral groove of generally V-shaped sections; and mechanically operable brake means engageable in said groove for releasably locking the brake.

11. The brake defined in claim 6 wherein said differential has a pair of output shafts connected with the respective vehicle wheels and a pair of brakes are provided respectively between said housing and the respective output shafts.

References Cited
UNITED STATES PATENTS

| | | | |
|---|---|---|---|
| 2,314,664 | 3/1943 | Shenstone | 74—710 X |
| 2,830,670 | 4/1958 | Ferguson | 74—710.5 X |
| 2,962,916 | 12/1960 | Koelsch | 74—710.5 |
| 3,191,708 | 6/1965 | Simonds et al. | 74—710.5 X |
| 3,369,428 | 2/1968 | Hughson | 74—710.5 |

ARTHUR T. McKEON, *Primary Examiner.*

U.S. Cl. X.R.

74—710.5; 192—51